(12) United States Patent
Guo et al.

(10) Patent No.: US 12,183,954 B2
(45) Date of Patent: Dec. 31, 2024

(54) BATTERY AND ELECTRIC DEVICE CONTAINING SAME

(71) Applicant: NINGDE AMPEREX TECHNOLOGY LIMITED, Ningde (CN)

(72) Inventors: Peipei Guo, Ningde (CN); Ping He, Ningde (CN); Yejun Peng, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 699 days.

(21) Appl. No.: 17/458,107

(22) Filed: Aug. 26, 2021

(65) Prior Publication Data

US 2022/0021087 A1  Jan. 20, 2022

Related U.S. Application Data

(63) Continuation of application No. PCT/CN2020/101927, filed on Jul. 14, 2020.

(51) Int. Cl.
*H01M 50/54* (2021.01)
*H01M 10/04* (2006.01)
(Continued)

(52) U.S. Cl.
CPC ....... *H01M 50/54* (2021.01); *H01M 10/0431* (2013.01); *H01M 50/116* (2021.01);
(Continued)

(58) Field of Classification Search
CPC .. H01M 50/54; H01M 50/502; H01M 50/116; H01M 50/533; H01M 50/552; H01M 10/0431; H01M 2220/30

See application file for complete search history.

(56) References Cited

U.S. PATENT DOCUMENTS

2013/0196220 A1  8/2013  Okutani et al.
2016/0020436 A1*  1/2016  Laulicht ............. H01M 50/193
                                                                   429/246
2019/0157656 A1  5/2019  Li et al.

FOREIGN PATENT DOCUMENTS

CN           1178325 C       12/2004
CN       204596909 U  *  8/2015
(Continued)

OTHER PUBLICATIONS

WO 2020037535 MT (Year: 2020).*
(Continued)

*Primary Examiner* — Alexander Usyatinsky
(74) *Attorney, Agent, or Firm* — XSENSUS LLP

(57) ABSTRACT

A battery, including a battery cell and a housing assembly accommodating the battery cell. The battery cell includes a first tab. The housing assembly includes a first housing body and a second housing body. The first housing body and the second housing body define an accommodation space to accommodate the battery cell. The first housing body and/or the second housing body include an installation portion provided with a via hole. A conductive member is disposed on an inner surface or an outer surface of the housing assembly and electrically connected to the first tab. In a through direction of the via hole, a projection of the conductive member is at least partially located in the via hole. The conductive member can avoid occupying internal space of the housing assembly, and increase the energy density of the battery. An electric device containing the battery is provided.

22 Claims, 11 Drawing Sheets

(51) Int. Cl.
  *H01M 50/116* (2021.01)
  *H01M 50/502* (2021.01)
  *H01M 50/533* (2021.01)
  *H01M 50/552* (2021.01)

(52) U.S. Cl.
  CPC ....... *H01M 50/502* (2021.01); *H01M 50/533* (2021.01); *H01M 50/552* (2021.01); *H01M 2220/30* (2013.01)

(56) References Cited

FOREIGN PATENT DOCUMENTS

| | | | |
|---|---|---|---|
| CN | 109192889 A | | 1/2019 |
| CN | 208433426 U | | 1/2019 |
| CN | 110752401 A | * | 2/2020 |
| CN | 111009625 A | | 4/2020 |
| CN | 111129365 A | | 5/2020 |
| CN | 111403637 A | | 7/2020 |
| DE | 102017219316 A1 | | 5/2019 |
| EP | 3886239 A1 | | 9/2021 |
| JP | 201946639 A | | 7/2019 |
| JP | 2020095924 A | | 6/2020 |
| TW | 201826588 A | | 7/2018 |
| WO | WO-2020037535 A1 | * | 2/2020 .......... H01M 50/147 |

OTHER PUBLICATIONS

CN 204596909 (Year: 2015).*
CN110752401MT (Year: 2020).*
The Decision to Grant a Patent published by SIPO for Application (Year: 2023).*
The Decision to Grant a Patent issued by JPO (Year: 2023).*
Ningde Amperex Technology Ltd, Extended European Search Report, EP20866913.5, Oct. 29, 2021, 7 pgs.
Ningde Amperex Technology Ltd, Third Office Action, CN202080001649.9, May 6, 2023, 7 pgs.
Ningde Amperex Technology Ltd, Office Action, JP2021517625, Sep. 12, 2023, 3 pgs.
Ningde Amperex Technology Ltd, First Office Action, KR1020217009260, Apr. 14, 2023, 6 pgs.
Ningde Amperex Technology Ltd, Office Action, KR1020217009260, Oct. 24, 2023, 3 pgs.
Ningde Amperex Technology Ltd, CN202080001649.9, First Office Action, May 6, 2022, 17 pgs.
Ningde Amperex Technology Ltd, CN202080001649.9, Second Office Action, Sep. 29, 2022, 14 pgs.
Ningde Amperex Technology Ltd, JP2021517625, First Office Action, Oct. 27, 2022, 8 pgs.
Ningde Amperex Technology Ltd, JP2021517625, Second Office Action, Feb. 24, 2023, 6 pgs.
International Search Report and Written Opinion, PCT/CN2020/101927, Apr. 16, 2021, 9 pgs.

* cited by examiner

BATTERY AND ELECTRIC DEVICE CONTAINING SAME

CROSS REFERENCE TO RELATED APPLICATION

This application is a continuation application of the PCT international application Serial No. PCT/CN2020/101927, entitled "BATTERY AND ELECTRIC DEVICE CONTAINING SAME" filed on Jul. 14, 2020, and the entire content of which is incorporated herein by reference.

TECHNICAL FIELD

This application relates to a battery and an electric device containing the battery.

BACKGROUND

Batteries are widely used in fields such as a mobile electronic device due to the portability. A battery usually includes a housing body, a top cover, a battery cell, and the like. The battery cell is located inside the housing body, and the top cover is located at an opening at an upper end of the housing body. An electrode post is disposed to penetrate through the top cover and electrically connect to the battery cell for powering an external device.

However, to meet installation requirements, the electrode post in the prior art needs to be H-shaped. That is, the electrode post includes an electrode post body and electrode post pads located on both sides of the electrode post body. The two electrode post pads are arranged on two surfaces of the top cover respectively. To electrically insulate the electrode post from the top cover, a layer of insulation spacer needs to be disposed between each of the two electrode post pads and the top cover. Therefore, along a direction perpendicular to the top cover, two layers of electrode post pads and two layers of insulation spacers totaling four layers are added in a place where the electrode post is disposed additionally on the top cover, thereby increasing an overall thickness of the top cover and reducing an energy density.

SUMMARY

In view of the foregoing situation, it is necessary to provide a battery capable of increasing the energy density.

In addition, it is necessary to provide an electric device containing the battery.

This application provides a battery, including a battery cell and a housing assembly accommodating the battery cell. The battery cell includes a first tab. The housing assembly includes a first housing body and a second housing body. The first housing body and the second housing body define an accommodation space to accommodate the battery cell.

The first housing body and/or the second housing body include an installation portion provided with a via hole. A material of the installation portion is an insulation material.

The battery further includes a conductive member electrically connected to the first tab. The conductive member is disposed on an inner surface or an outer surface of the housing assembly. In a through direction of the via hole, a projection of the conductive member is at least partially located in the via hole.

In some embodiments of this application, the first housing body includes a bottom wall and a sidewall. The sidewall is disposed on a periphery of the bottom wall, and forms the accommodation space together with the bottom wall. The via hole is located on the bottom wall, the sidewall, or the second housing body.

In some embodiments of this application, the sidewall includes a first surface facing away from the bottom wall. The first housing body further includes a first protruding portion. The first protruding portion is disposed protrusively on the first surface, and forms an accommodation groove together with the first surface. The second housing body is disposed on the first surface. An edge of the second housing body is accommodated in the accommodation groove.

In some embodiments of this application, the first housing body further includes a second protruding portion. The second protruding portion is formed by horizontally extending the first protruding portion from an end away from the first surface toward a central axis of the battery. The second protruding portion, the first protruding portion, and the first surface together form the accommodation groove. The second protruding portion is further connected to a surface of the second housing body facing away from the battery cell.

In some embodiments of this application, the insulation material is selected from one or more of polystyrene, polypropylene, polyethylene, polyester, polyvinyl chloride, polyimide, acrylonitrile-butadiene-styrene plastic, polycarbonate, polyamide, and ceramics.

In some embodiments of this application, the conductive member is disposed on a surface selected from the group consisting of a surface of the second housing body, a surface of the bottom wall and a surface of the sidewall, wherein the surface faces away from the battery cell.

In some embodiments of this application, the conductive member is disposed on a surface selected from the group consisting of a surface of the second housing body, a surface of the bottom wall and a surface of the sidewall, wherein the surface faces the battery cell.

In some embodiments of this application, the battery further includes an adapter member, and the adapter member is electrically connected to the conductive member and the first tab.

In some embodiments of this application, a thickness of the conductive member is 0.01 mm to 2 mm.

In some embodiments of this application, the battery cell further includes a first electrode plate, a second electrode plate, and a second tab whose polarity is different from that of the first tab. The first tab is electrically connected to the first electrode plate. The second tab is electrically connected to the second electrode plate. The first electrode plate and the second electrode plate are stacked or wound to form the battery cell. A material of the first housing body is a conductive material. The second tab is electrically connected to the first housing body.

In some embodiments of this application, the conductive material is selected from one or more of a steel alloy, an aluminum alloy, an iron alloy, a copper alloy, a nickel alloy, and stainless steel.

In some embodiments of this application, the conductive member fully overlays the via hole.

In some embodiments of this application, the first housing body and/or the second housing body further include a conductive portion connected to the installation portion.

In some embodiments of this application, a material of the first housing body and/or the second housing body is an insulation material.

This application further provides an electric device, containing the battery described above.

In this application, the conductive member is disposed, and the first tab is electrically connected to the conductive member. In this way, the polarity of the first tab can be led out after an external electrical connecting member is connected to the conductive member. According to this application, the first housing body and/or the second housing body include an installation portion provided with a via hole. A material of the installation portion is an insulation material. The conductive member is disposed on an inner surface or an outer surface of the housing assembly. In a through direction of the via hole, a projection of the conductive member is at least partially located in the via hole. Therefore, the conductive member may be configured to replace the electrode post in the prior art. In addition, no insulator needs to be disposed between the conductive member and a to-be-installed object (the first housing body or the second housing body). In contrast with the circumstance in the prior art in which additional four layers need to be added in a place where the electrode post is disposed on the housing assembly, this application only increases a thickness of one layer of the conductive member to be added on the housing assembly, thereby reducing the thickness of the housing assembly and helping to increase the energy density of the battery when an overall volume of the battery is constant. In addition, the battery containing no electrode post in this application can effectively avoid the risks of short circuits or electrolyte leakages caused by an extrusion of the electrode post to the interior of the battery.

REFERENCE NUMERALS

Figure 1:
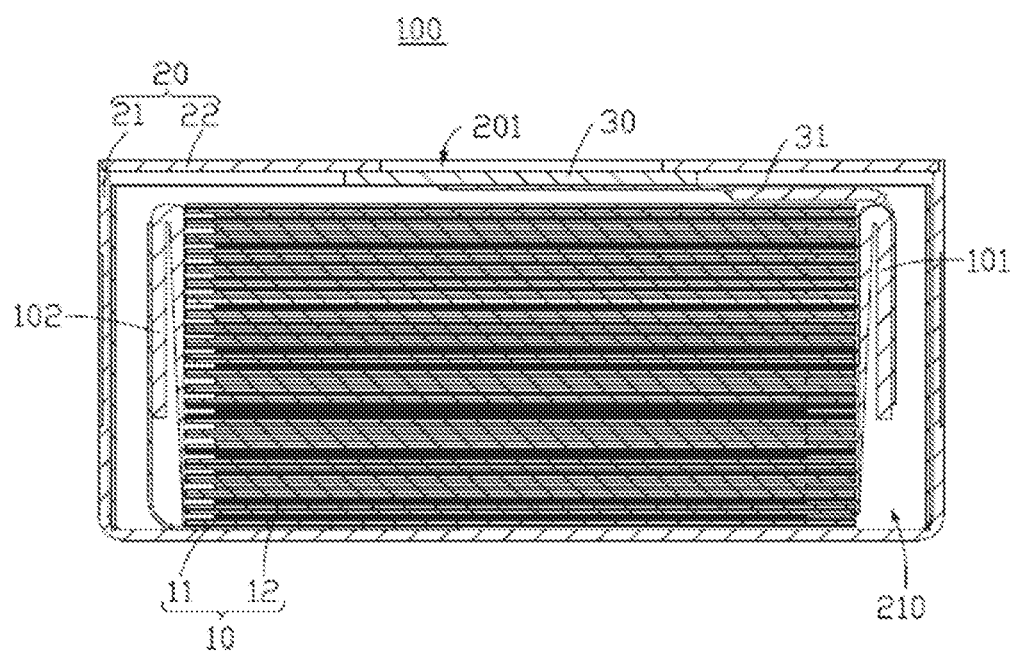
FIG. 1 is a schematic cross-sectional view of a battery according to an embodiment of this application.

Electric device 1
Battery 100
Battery cell 10
First tab 101
Second tab 102
First electrode plate 11
Second electrode plate 12
Housing assembly 20
Via hole 201
First housing body 21
Accommodation space 210
Bottom wall 211
Sidewall 212
First surface 2121
First protruding portion 213
Accommodation groove 214
Second protruding portion 215
Second housing body 22
Conductive member 30
Adapter member 31
External connecting member 40
First external connecting portion 401
Second external connecting portion 402
Third external connecting portion 403
Bonding member 50
Central axis Z This application is further described below with reference to the following specific embodiments and the foregoing drawings.

DETAILED DESCRIPTION OF EMBODIMENTS

The following clearly and fully describes the technical solutions in the embodiments of this application with reference to the drawings hereof. Apparently, the described embodiments are merely a part of but not all of the embodiments of this application.

Unless otherwise defined, all technical and scientific terms used herein have the same meanings as usually understood by a person skilled in the technical field of this application. The terms used in the specification of this application herein are merely intended for describing specific embodiments but are not intended to limit this application.

The following describes some embodiments of this application in detail with reference to drawings. To the extent that no conflict occurs, the following embodiments and the features in the embodiments may be combined with each other.

Referring to FIG. 1, this application provides a battery 100. The battery 100 includes a battery cell 10 and a housing assembly 20. The battery cell 10 includes a first tab 101. The housing assembly 20 includes a first housing body 21 and a second housing body 22. The first housing body 21 and the second housing body 22 define an accommodation space 210 to accommodate the battery cell 10. The first housing body 21 and/or the second housing body 22 include an installation portion (without a reference numeral) provided with a via hole 201. A material of the installation portion is an insulation material. The battery 100 further includes a conductive member 30 electrically connected to the first tab 101. The conductive member 30 is disposed on an inner surface or an outer surface of the housing assembly 20. In a through direction of the via hole 201, a projection of the conductive member 30 is at least partially located in the via hole 201. In this embodiment, the conductive member 30 fully overlays the via hole 201, so that the battery cell 10 is sealed in the housing assembly 20. The via hole 201 is located on the installation portion made of an insulation material. Therefore, electrical isolation can be implemented between the conductive member 30 and the first housing body 21 or the second housing body 22 when (i) the conductive member 30 is disposed on the inner surface or the outer surface of the housing assembly 20 and (ii) in the through direction of the via hole 201, a projection of the conductive member 30 is at least partially located in the via hole 201.

In an embodiment, the material of the second housing body 22 is an insulation material, and therefore, the installation portion provided with the via hole 201 belongs to a partial region of the second housing body 22. Alternatively, the second housing body 22 may be a combination of an installation portion made of an insulation material and a conductive portion made of a conductive material. For example, the second housing body 22 is a cover, and the cover includes an installation portion located at a center and a conductive portion surrounding the installation portion, wherein the conductive portion is made of a conductive material. Alternatively, the via hole 201 may be disposed on the first housing body 21, or disposed on the bottom wall 211 or the sidewall 212 of the first housing body 21. The material of the bottom wall 211 or the sidewall 212 of the first housing body 21 may be an insulation material, or the first housing body may be a combination of an installation portion made of an insulation material and a conductive portion made of a conductive material.

In an embodiment, the conductive member 30 overlays a part of the via hole 201. In this case, the battery cell 10 needs to be sealed in the housing assembly 20 by using other seals. Alternatively, the conductive member 30 may fully overlays the via hole 201.

Figure 2:
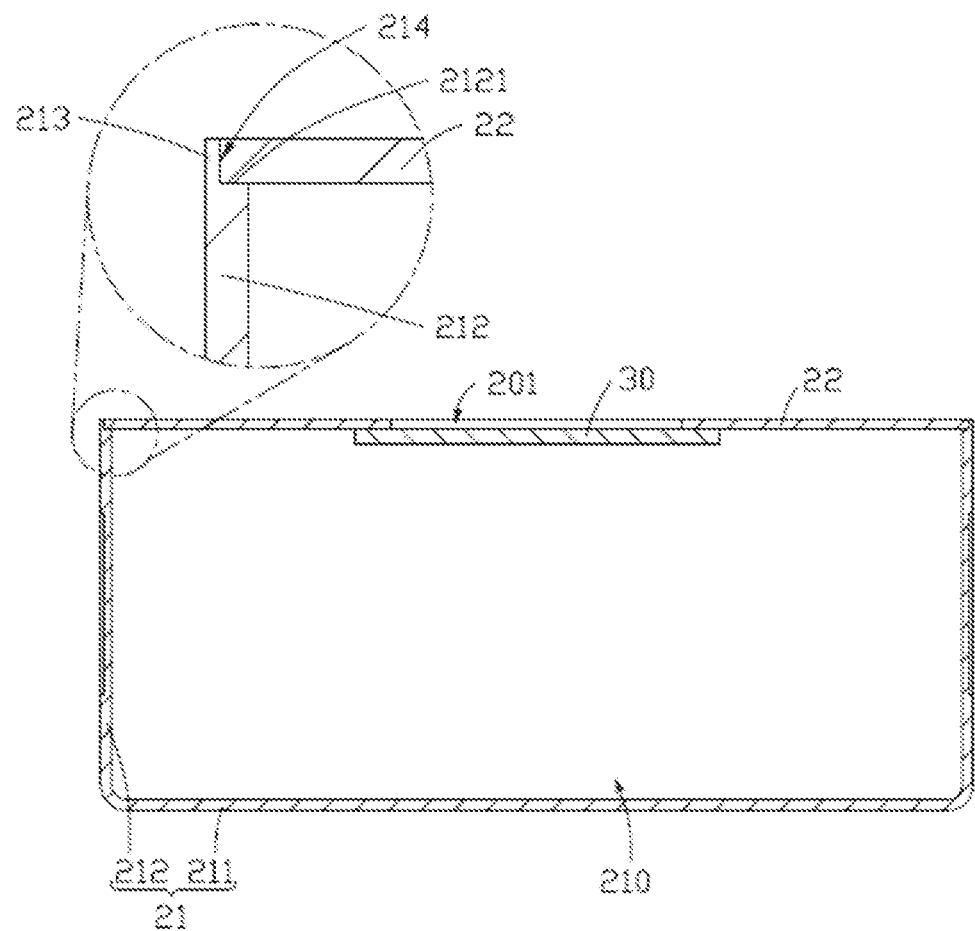
FIG. 2 is a schematic cross-sectional view of a housing assembly and a conductive member shown in FIG. 1.

In this application, the conductive member 30 is disposed, and the first tab 101 is electrically connected to the conductive member 30. In this way, the polarity of the first tab 101 can be led out after an external electrical connecting piece is connected to the conductive member 30. Therefore, the conductive member 30 may be configured to replace the electrode post in the prior art. In contrast with the circumstance in the prior art in which additional four layers need to be added in a place where the electrode post is disposed on the housing assembly, this application only increases a thickness of one layer of conductive member 30 to be added on the housing assembly 20, thereby reducing the thickness of the housing assembly 20 and helping to increase the energy density of the battery 100 when an overall volume of the battery 100 is constant, in addition, preventing the electrode post from penetrating the electrode plate of the battery 100 during a crush test, and thereby avoiding short circuits. In this embodiment, the battery cell 10 is a stacked battery cell, but in other embodiments, the battery cell may be a wound battery cell, details of which are omitted here. Referring to FIG. 2, the first housing body 21 includes a bottom wall 211 and a sidewall 212. The sidewall 212 is disposed on a periphery of the bottom wall 211, and forms the accommodation space 210 together with the bottom wall 211. The via hole 201 is located at the bottom wall 211, the sidewall 212, or the second housing body 22 (referring to FIG. 1 to FIG. 10). The sidewall 212 includes a first surface 2121 facing away from the bottom wall 211.

In an embodiment, referring to FIG. 2, the first housing body 21 further includes a first protruding portion 213. The first protruding portion 213 is disposed protrusively on the first surface 2121, and forms an accommodation groove 214 together with the first surface 2121. The second housing body 22 is disposed on the first surface 2121, and an edge of the second housing body 22 is accommodated in the accommodation groove 214. The second housing body 22 is fixed hermetically to the first housing body 21 by melt-embedding or by bonding. In this way, a problem of the shrinkage of a separator (not shown in the drawing) inside the battery 100 is avoided, wherein the problem is caused by laser welding between the first housing body 21 and the second housing body 22 (inside the housing assembly 20, the separator is closer to the sealing region of the housing assembly 20, and, if the sealing is performed by welding the two housing bodies, a high temperature in the welding process will cause the separator to shrink and lead to a short circuit due to a contact between a positive electrode plate and a negative electrode plate), and processing costs can be reduced.

Figure 3:
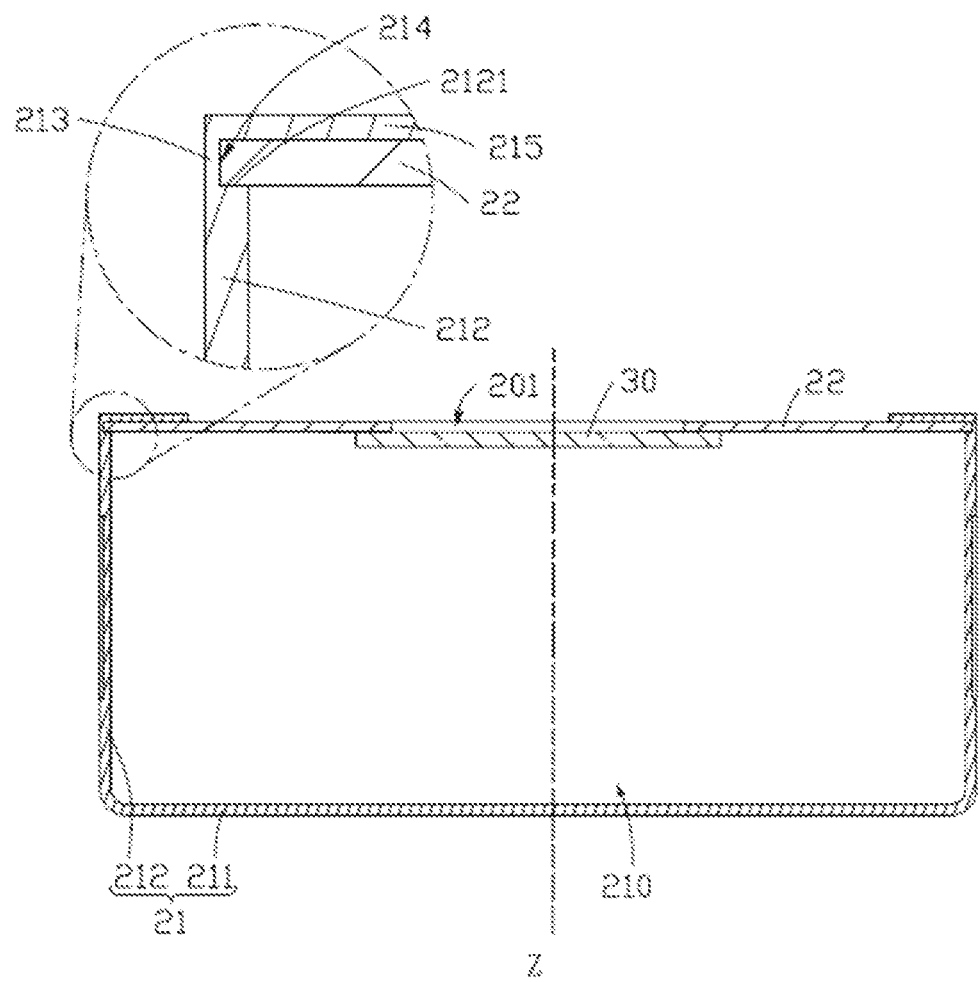
FIG. 3 is a schematic cross-sectional view of a housing assembly and a conductive member according to an embodiment of this application.

In another embodiment, referring to FIG. 3, the first housing body 21 further includes a second protruding portion 215. The second protruding portion 215 is formed by horizontally extending the first protruding portion 213 from an end away from the first surface 2121 toward a central axis Z of the battery 100. The second protruding portion 215, the first protruding portion 213, and the first surface 2121 together form the accommodation groove 214. The second protruding portion 215 may also be connected to a surface of the second housing body 22 facing away from the battery cell 10. The second protruding portion 215 is disposed to further strengthen the connection between the first housing body 21 and the second housing body 22 and ensure the reliability of the sealing of the housing assembly 20. The second protruding portion 215 is parallel to the bottom wall 211.

The material of the first housing body 21 may be an insulation material or a conductive material. The thickness of the first housing body 21 is in the range of from 0.05 mm to 2 mm. Optionally, the thickness of the first housing body 21 is 0.2 mm.

The material of the second housing body 22 may be an insulation material or a conductive material. The thickness of the second housing body 22 is in the range of from 0.05 mm to 2 mm. Optionally, the thickness of the first housing body 21 is 0.15 mm.

The insulation material is selected from but not limited to one or more of polystyrene (PS), polypropylene (PP), polyethylene (PE), polyester (PET), polyvinyl chloride (PVC), polyimide (PI), acrylonitrile-butadiene-styrene plastic (ABS), polycarbonate (PC), polyamide (PA), and ceramics. The conductive material is not limited to one or more of a steel alloy, an aluminum alloy, an iron alloy, a copper alloy, a nickel alloy, and stainless steel.

The conductive member 30 may be bonded to or embedded into the second housing body 22.

In an embodiment, referring to FIG. 2 to FIG. 5, the conductive member 30 is disposed on a surface selected from the group consisting of a surface of the second housing body 22, a surface of the bottom wall 211 and a surface of the sidewall 212, wherein the surface faces away from the battery cell 10. That is, the conductive member 30 is located outside the housing assembly 20, and may be directly used as an external port. The battery 100 generates gas inside the housing assembly 20 during normal operation, thereby increasing internal pressure. When the internal pressure exceeds a preset value, the conductive member 30 will burst open, and will be detached from the housing assembly 20, so as to achieve a purpose of pressure relief, prevent explosion of the battery 100, and ensure the safety of the battery 100. In addition, the first tab 101 runs through the via hole 201 and is electrically connected to the conductive member 30. The polarity of the first tab 101 can be led out of the housing assembly 20 after an external electrical connecting member is connected to the conductive member 30.

Figure 6:
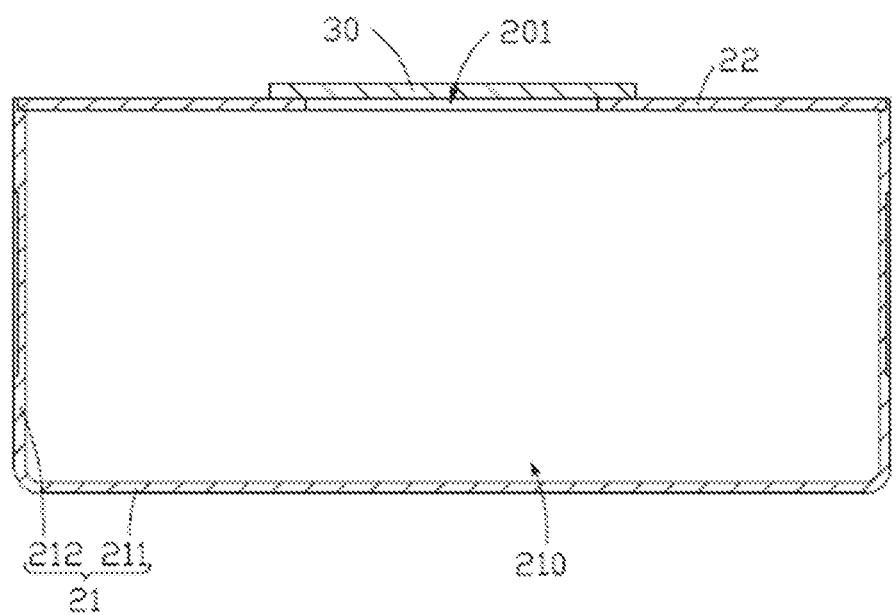
FIG. 6 is a schematic cross-sectional view of a housing assembly and a conductive member according to still another embodiment of this application.
Figure 7:
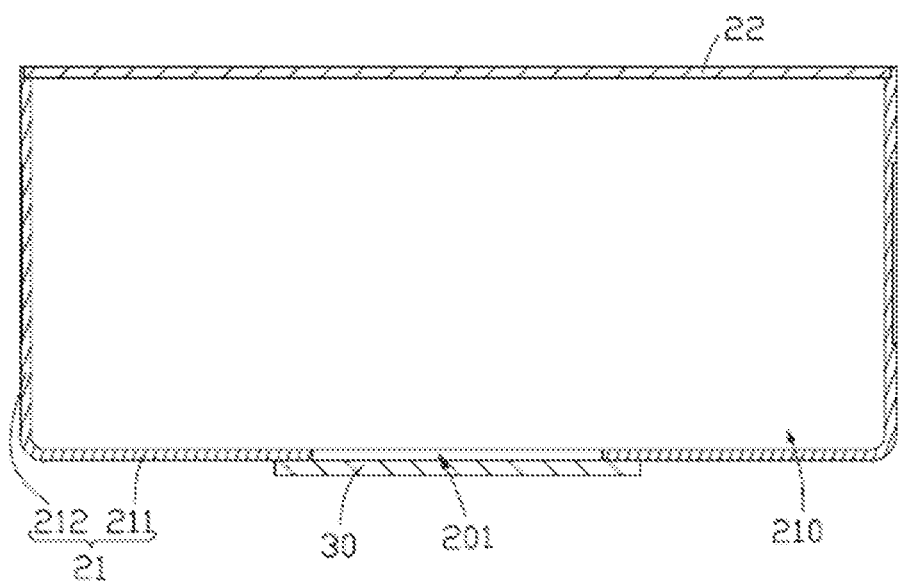
FIG. 7 is a schematic cross-sectional view of a housing assembly and a conductive member according to still another embodiment of this application.
Figure 8:
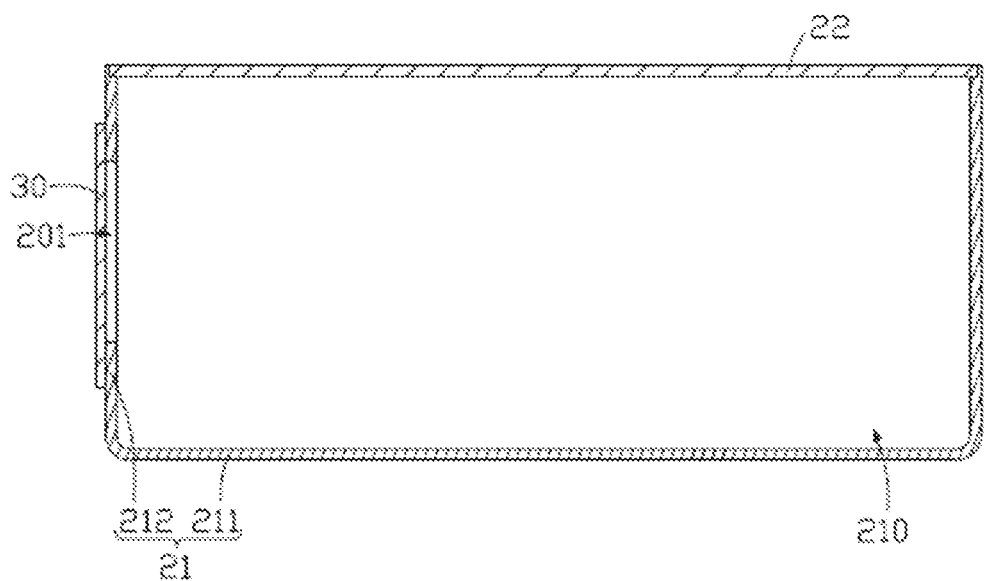
FIG. 8 is a schematic cross-sectional view of a housing assembly and a conductive member according to still another embodiment of this application.

In another embodiment, referring to FIG. 6 to FIG. 8, the conductive member 30 is disposed on a surface selected from the group consisting of a surface of the second housing body 22, a surface of the bottom wall 211 and a surface of the sidewall 212, wherein the surface faces the battery cell 10. That is, the conductive member 30 is located inside the housing assembly 20. Therefore, the overall shape of the housing assembly 20 is flat, the exterior of the battery 100 is more regular, and a height difference exists between the conductive member 30 and a top surface of the housing assembly 20, thereby avoiding external short circuits. In addition, the external electrical connecting member can be connected to the conductive member 30 through the via hole 201, so that the polarity of the first tab 101 can be led out of the housing assembly 20.

Referring to FIG. 1, further, the battery 100 further includes an adapter member 31. The adapter member 31 is electrically connected to the conductive member 30 and a plurality of a first tabs 101. In this way, by means of the adapter member 31, a plurality of the first tabs 101 are electrically connected to the conductive member 30. Through the conductive member 30, the first tabs are led out of the housing assembly 20. In this embodiment, the adapter member 31 is located in the housing assembly 20. In other embodiments, the battery cell may also be a wound cell. Only one first tab is disposed on the wound cell, so that no adapter member 31 is required and the first tab 101 is directly electrically connected to the conductive member.

Figure 9:
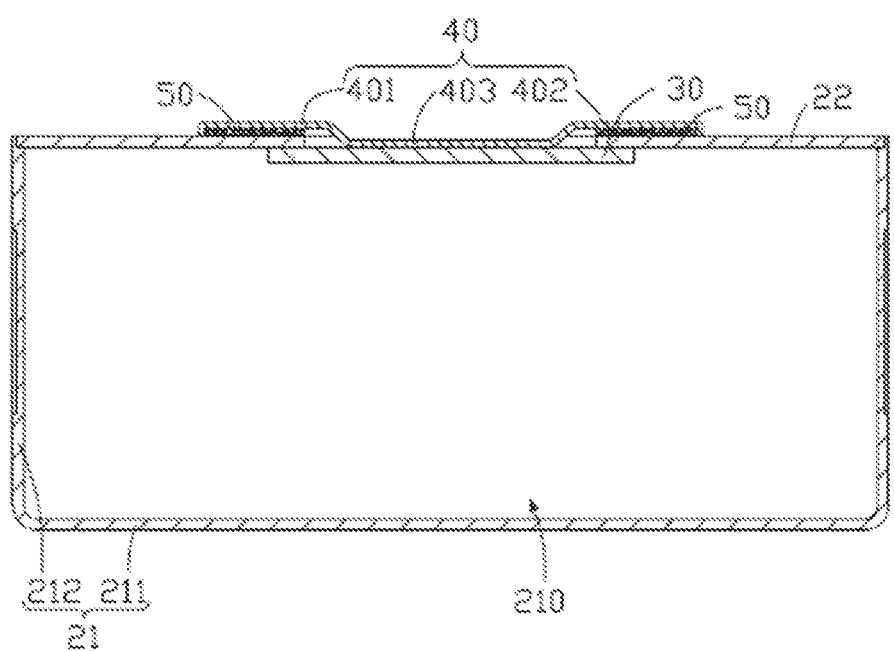
FIG. 9 is a schematic cross-sectional view of a housing assembly, a conductive member, an adapter member, and a bonding member according to an embodiment of this application.

Referring to FIG. 9, the battery 100 further includes an external connecting member 40. The external connecting member 40 is disposed on a surface of the conductive member 30 faces away from the battery cell 10. The external connecting member 40 is welded to the conductive member 30 to implement electrical connection to the conductive member 30. In this way, the external connecting member 40 is disposed so that the polarity of the first tab 101 can be led out of the housing assembly 20.

Specifically, referring to FIG. 9, the external connecting member 40 includes a first external connecting portion 401, a second external connecting portion 402, and a third external connecting portion 403 connected between the first external connecting portion 401 and the second external connecting portion 402. The first external connecting portion 401 and the second external connecting portion 402 are disposed on a surface of the second housing body 22 facing away from the battery cell 10. The third external connecting portion 403 is disposed on a surface of the conductive member 30 facing away from the battery cell 10. The third external connecting portion 403 is welded to the conductive member 30.

In an embodiment, the external connecting member 40 may be fixed to the second housing body 22 by melt-embedding.

Further, referring to FIG. 9, the battery 100 further includes a bonding member 50. The bonding member 50 is disposed between the first external connecting portion 401 and the second housing body 22, and/or disposed between the second external connecting portion 402 and the second housing body 22.

In this embodiment, the material of the conductive member 30 may be metal. For example, the material of the conductive member 30 may be a steel alloy, an aluminum alloy, an iron alloy, a copper alloy, a nickel alloy, or the like. Optionally, the material of the conductive member 30 is stainless steel. The thickness of the conductive member 30 is in the range of from 0.01 mm to 2 mm. Optionally, the thickness of the conductive member 30 is 0.15 mm.

The shape of the conductive member 30 may be a circle, a square, an ellipse, a triangle, a polygon, or the like. The shape of the via hole 201 may be a circle, a square, an ellipse, a triangle, a polygon, or the like. The shape of the conductive member 30 may be identical to or different from the shape of the via hole 201.

Figure 10:
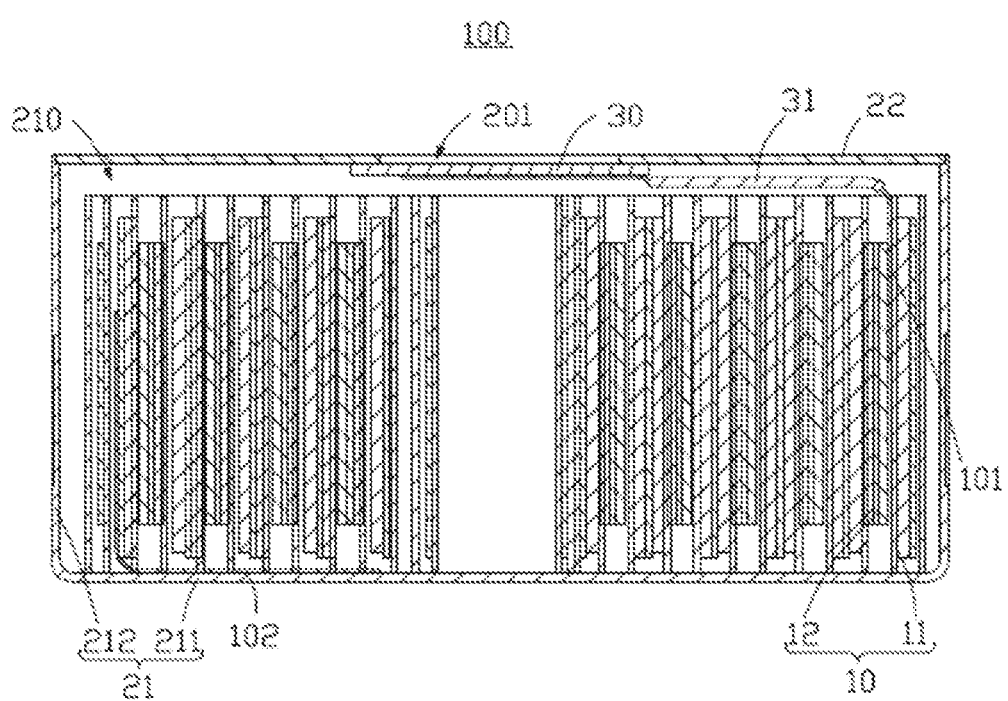
FIG. 10 is a schematic cross-sectional view of a battery according to another embodiment of this application.

Referring to FIG. 1 and FIG. 10, the battery cell 10 further includes a second tab 102 whose polarity is different from that of the first tab 101. When the material of the first housing body 21 is a conductive material, the second tab 102 is electrically connected to the first housing body 21, and the first housing body 21 can exhibit an electrical polarity identical to that of the second tab 102. Because the first tab 101 is electrically connected to the conductive member 30, the conductive member 30 can exhibit an electrical polarity identical to that of the first tab 101. Because the conductive member 30 is electrically insulated from the second housing body 22, the conductive member 30 and the first housing body 21 can exhibit opposite electrical polarities.

In this embodiment, the first tab 101 is a positive tab, and the second tab 102 is a negative tab. The second tab 102 may be electrically connected to the first housing body 21 by welding, and the first tab 101 may be electrically connected to the conductive member 30 by welding.

Referring to FIG. 1 and FIG. 10, the battery cell 10 further includes a first electrode plate 11 and a second electrode plate 12. The first tab 101 is electrically connected to the first electrode plate 11. The second tab 102 is electrically connected to the second electrode plate 12. The first electrode plate 11 and the second electrode plate 12 are stacked or wound to form the battery cell 10. Specifically, the first electrode plate 11 includes a first current collector and a first active material layer formed on the first current collector. The second electrode plate 12 includes a second current collector and a second active material layer formed on the second current collector. The first tab 101 and the second tab 102 may be electrically connected to the first current collector and the second current collector by welding, respectively. The first electrode plate 11 and the second electrode plate 12 are stacked or wound to form the battery cell 10. More specifically, a separator (not shown in the drawing) is further disposed between the first electrode plate 11 and the second electrode plate 12.

Figure 11:
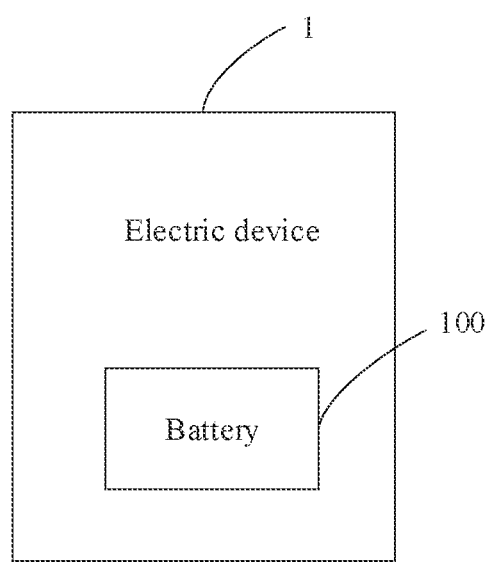
FIG. 11 is a schematic module diagram of an electric device according to an embodiment of this application.

Referring to FIG. 11, an electric device 1 contains the battery 100. The electric device 1 may be a consumer electronic product, such as a smart phone, in other embodiments, the electric device 1 may also be an electric tool, an energy storage device, a power device, or the like. For example, the electric device 1 may also be an electric vehicle.

The following describes the battery 100 in this application in detail with reference to embodiments.

Embodiment 1

Referring to FIG. 1, the battery 100 includes a battery cell 10, a housing assembly 20 configured to accommodate the battery cell 10, and a conductive member 30.

Referring to FIG. 1, the battery cell 10 includes a first electrode plate 11, the second electrode plate 12, a first tab 101, and a second tab 102. The first electrode plate 11 and the second electrode plate 12 are stacked to form the battery cell 10. The first tab 101 is electrically connected to the first electrode plate 11. The second tab 102 is electrically connected to the second electrode plate 12. In other embodiments, referring to FIG. 10, the battery cell 10 may be formed by winding the first electrode plate 11 and the second electrode plate 12.

Referring to FIG. 1, the housing assembly 20 includes a first housing body 21 and a second housing body 22. The material of the second housing body 22 is an insulation material.

Referring to FIG. 2, the first housing body 21 includes a bottom wall 211, a sidewall 212, and a first protruding portion 213. The sidewall 212 is disposed on a periphery of the bottom wall 211, and forms an accommodation space 210 together with the bottom wall 211. The battery cell 10 is accommodated in the accommodation space 210. The second tab 102 is further electrically connected to the first housing body 21.

Referring to FIG. 2, the first protruding portion 213 is disposed protrusively on the first surface 2121, and forms an accommodation groove 214 together with the first surface 2121. The second housing body 22 is disposed on the first surface 2121, and an edge of the second housing body 22 is accommodated in the accommodation groove 214.

Referring to FIG. 1 and FIG. 2, the second housing body 22 is provided with a via hole 201. The conductive member 30 is disposed on a surface of the second housing body 22 and fully overlays the via hole 201, wherein the surface faces the battery cell 10, so that the battery cell 10 is sealed in the housing assembly 20. The conductive member 30 is electrically connected to the first tab 101.

In Embodiment 1, the battery 100 is a button battery.

Embodiment 2

Embodiment 2 differs from Embodiment 1 in a structure of the first housing body 21.

In contrast with Embodiment 1, referring to FIG. 3, the first housing body 21 in Embodiment 2 further includes a second protruding portion 215. The second protruding portion 215 is formed by horizontally extending the first protruding portion 213 from an end away from the first surface 2121 toward a central axis Z of the battery 100. The second protruding portion 215, the first protruding portion 213, and the first surface 2121 together form the accommodation groove 214. The second protruding portion 215 may also be connected to a surface of the second housing body 22, wherein the surface faces away from the battery cell 10. The second protruding portion 215 is parallel to the bottom wall 211.

Embodiment 3

Embodiment 3 differs from Embodiment 1 in the locations of the via hole 201 and the conductive member 30.

Figure 4:
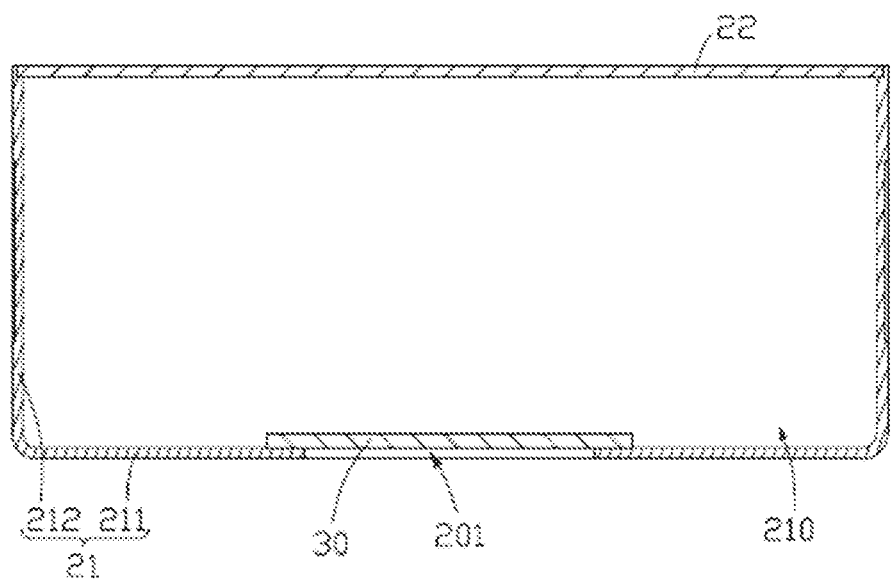
FIG. 4 is a schematic cross-sectional view of a housing assembly and a conductive member according to another embodiment of this application.

In Embodiment 3, referring to FIG. 4, the via hole 201 is located on the bottom wall 211. The material of the first housing body 21 is an insulation material. The conductive member 30 is disposed on a surface of the bottom wall 211 and fully overlays the via hole 201, wherein the surface faces the battery cell 10.

Embodiment 4

Embodiment 4 differs from Embodiment 3 in the locations of the via, hole 201 and the conductive member 30.

Figure 5:
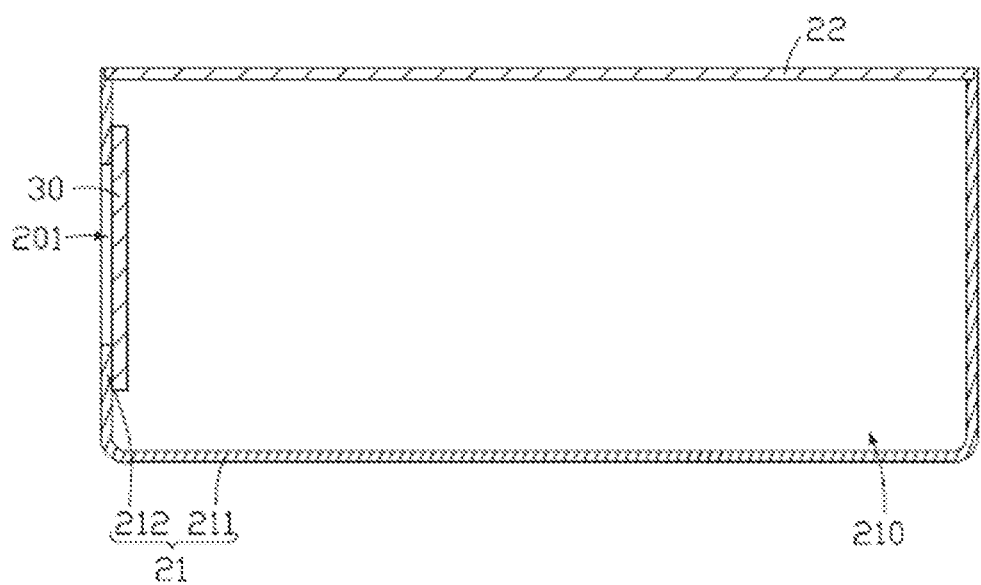
FIG. 5 is a schematic cross-sectional view of a housing assembly and a conductive member according to still another embodiment of this application.

In Embodiment 4, referring to FIG. 5, the via hole 201 is located on the sidewall 212. The conductive member 30 is disposed on a surface of the sidewall 212 and fully overlays the via hole 201, wherein the surface faces the battery cell 10.

Embodiment 5

Embodiment 5 differs from Embodiment 1 in the location of the conductive member 30.

In Embodiment 5, referring to FIG. 6, the conductive member 30 is disposed on a surface of the second housing body 22 and fully overlays the via hole 201, wherein the surface faces away from the battery cell 10.

Embodiment 6

Embodiment 6 differs from Embodiment 3 in the location of the conductive member 30.

In Embodiment 6, referring to FIG. 7, the conductive member 30 is disposed on a surface of the bottom wall 211 and fully overlays the via hole 201, wherein the surface faces away from the battery cell 10.

Embodiment 7

Embodiment 7 differs from Embodiment 4 in the location of the conductive member 30.

In Embodiment 7, referring to FIG. 8, the conductive member 30 is disposed on a surface of the sidewall 212 and fully overlays the via hole 201, wherein the surface faces away from the battery cell 10.

Embodiment 8

Embodiment 8 differs from Embodiment 1 in that the battery 100 in Embodiment 8 further includes an external connecting member 40 and a bonding member 50.

In Embodiment 8, referring to FIG. 9, the external connecting member 40 includes a first external connecting portion 401, a second external connecting portion 402, and a third external connecting portion 403 connected between the first external connecting portion 401 and the second external connecting portion 402. The first external connecting portion 401 and the second external connecting portion 402 are disposed on a surface of the second housing body 22, wherein the surface faces away from the battery cell 10. The third external connecting portion 403 is disposed on a surface of the conductive member 30, wherein the surface faces away from the battery cell 10. The third external connecting portion 403 is welded to the conductive member 30. The bonding member 50 is disposed between the first external connecting portion 401 and the second housing body 22, and disposed between the second external connecting portion 402 and the second housing body 22.

The foregoing descriptions are merely exemplary embodiments of this application, but are not intended to limit this application. Any modifications, equivalent substitutions, and improvements made without departing from the spirit and principles of this application shall fall within the protection scope of this application.

What is claimed is:
1. A battery, comprising:
a battery cell and a housing assembly accommodating the battery cell, wherein the battery cell comprises a first tab, the housing assembly comprises a first housing body and a second housing body, the first housing body and the second housing body define an accommodation space to accommodate the battery cell; and the first housing body and/or the second housing body comprise an installation portion provided with a via hole, and the installation portion is made of an insulation material; and wherein the battery further comprising a conductive member electrically connected to the first tab, the conductive member is disposed on an inner surface or an outer surface of the housing assembly; and a projection of the conductive member is at least partially located in the via hole in a through direction of the via hole, the first housing body comprises a bottom wall and a sidewall, the sidewall is disposed on a periphery of the bottom wall and forms the accommodation space together with the bottom wall; and the via hole is located on the bottom wall, the sidewall, or the second housing body, the sidewall comprises a first surface facing away from the bottom wall; and the first housing body comprises a first protruding portion, the first protruding portion is disposed protrusively on the first surface and forms an accommodation groove together with the first surface; and the second housing body is disposed on the first surface, an edge of the second housing body is accommodated in the accommodation groove, and the first housing body comprises a second protruding portion, the second protruding portion is formed by horizontally extending the first protruding portion from an end away from the first surface toward a central axis of the battery; the second protruding portion, the first protruding portion, and the first surface together form the accommodation groove; and the second protruding portion is further directly connected to a surface of the second housing body facing away from the battery cell.

2. The battery according to claim 1, wherein the conductive member is disposed on a surface selected from the group consisting of a surface of the second housing body, a surface of the bottom wall and a surface of the sidewall, wherein the surface faces away from the battery cell.

3. The battery according to claim 1, wherein the conductive member is disposed on a surface selected from the group consisting of a surface of the second housing body, a surface of the bottom wall, a surface of the sidewall, wherein the surface faces away from the battery cell.

4. The battery according to claim 1, further comprising an adapter member, wherein the adapter member is electrically connected to the conductive member and the first tab.

5. The battery according to claim 1, wherein a thickness of the conductive member is in the range of from 0.01 mm to 2 mm.

6. The battery according to claim 1, wherein the battery cell further comprises a first electrode plate, a second electrode plate, and a second tab with an opposite polarity to the first tab; the first tab is electrically connected to the first electrode plate; the second tab is electrically connected to the second electrode plate; the first electrode plate and the second electrode plate are stacked or wound to form the battery cell; the first housing body is made of a conductive material; the second tab is electrically connected to the first housing body.

7. The battery according to claim 1, wherein the conductive member fully overlays the via hole.

8. The battery according to claim 1, wherein the first housing body and/or the second housing body further comprise a conductive portion connected to the installation portion.

9. The battery according to claim 1, wherein the first housing body and/or the second housing body is made of an insulation material.

10. An electric device, comprising the battery according to claim 1.

11. The electric device according to claim 10, wherein the first housing body comprises a bottom wall and a sidewall, the sidewall is disposed on a periphery of the bottom wall and forms the accommodation space together with the bottom wall; and the via hole is located on the bottom wall, the sidewall, or the second housing body.

12. The electric device according to claim 11, wherein the sidewall comprises a first surface facing away from the bottom wall; and the first housing body comprises a first protruding portion, the first protruding portion is disposed protrusively on the first surface and forms an accommodation groove together with the first surface; and the second housing body is disposed on the first surface, an edge of the second housing body is accommodated in the accommodation groove.

13. The electric device according to claim 12, wherein the first housing body comprises a second protruding portion, the second protruding portion is formed by horizontally extending the first protruding portion from an end away from the first surface toward a central axis of the battery; the second protruding portion, the first protruding portion, and the first surface together form the accommodation groove; and the second protruding portion is further connected to a surface of the second housing body facing away from the battery cell.

14. The electric device according to claim 11, wherein the conductive member is disposed on a surface selected from the group consisting of a surface of the second housing body, a surface of the bottom wall and a surface of the sidewall, wherein the surface faces away from the battery cell.

15. The electric device according to claim 11, wherein the conductive member is disposed on a surface selected from the group consisting of a surface of the second housing body, a surface of the bottom wall, a surface of the sidewall, wherein the surface faces away from the battery cell.

16. The electric device according to claim 10, further comprising an adapter member, wherein the adapter member is electrically connected to the conductive member and the first tab.

17. The electric device according to claim 10, wherein a thickness of the conductive member is in the range of from 0.01 mm to 2 mm.

18. The electric device according to claim 10, wherein the battery cell further comprises a first electrode plate, a second electrode plate, and a second tab with an opposite polarity to the first tab; the first tab is electrically connected to the first electrode plate; the second tab is electrically connected to the second electrode plate; the first electrode plate and the second electrode plate are stacked or wound to form the battery cell; the first housing body is made of a conductive material; the second tab is electrically connected to the first housing body.

19. The electric device according to claim 10, wherein the conductive member fully overlays the via hole.

20. The electric device according to claim 10, wherein the first housing body and/or the second housing body further comprise a conductive portion connected to the installation portion.

21. The electric device according to claim 10, wherein the first housing body and/or the second housing body is made of an insulation material.

22. The battery according to claim 1, wherein the second housing body is wholly made of the insulation material.

\* \* \* \* \*